US012609623B2

(12) United States Patent
Kim et al.

(10) Patent No.: US 12,609,623 B2
(45) Date of Patent: Apr. 21, 2026

(54) CONVERTER FOR PERFORMING DC-DC CONVERSION AND METHOD FOR CONTROLLING SAME

(71) Applicant: LG ENERGY SOLUTION, LTD., Seoul (KR)

(72) Inventors: Jongcheol Kim, Daejeon (KR); Inho Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 650 days.

(21) Appl. No.: 18/019,075

(22) PCT Filed: Apr. 21, 2022

(86) PCT No.: PCT/KR2022/005730
§ 371 (c)(1),
(2) Date: Jan. 31, 2023

(87) PCT Pub. No.: WO2022/239999
PCT Pub. Date: Nov. 17, 2022

(65) Prior Publication Data
US 2023/0283188 A1     Sep. 7, 2023

(30) Foreign Application Priority Data

May 14, 2021   (KR) ........................ 10-2021-0062341

(51) Int. Cl.
H01M 10/46 (2006.01)
H02J 3/32 (2006.01)
(Continued)

(52) U.S. Cl.
CPC ........... H02M 3/33573 (2021.05); H02J 3/32 (2013.01); H02J 7/50 (2026.01); H02J 7/90 (2026.01);
(Continued)

(58) Field of Classification Search
CPC ...... H02J 7/0013; H02J 7/007; H02J 2207/20; H02J 3/32; H02J 7/90; H02J 7/50;
(Continued)

(56) References Cited

U.S. PATENT DOCUMENTS 9,718,376 B2     8/2017 Chemin et al.
10,804,809 B1 *  10/2020 Yelaverthi ............... H02J 1/102
(Continued)

FOREIGN PATENT DOCUMENTS

CN     101467324 A     6/2009
CN     105814769 A     7/2016
(Continued)

OTHER PUBLICATIONS

Machine translation of WO2020026965A1 (Feb. 6, 2020) (Year: 2020).*
(Continued)

*Primary Examiner* — Edward Tso
(74) *Attorney, Agent, or Firm* — Morgan, Lewis & Bockius LLP

(57)          ABSTRACT
A DC-DC converter, located between a plurality of batteries and a power conversion system, comprises a primary coil connected to a plurality of battery sources and a secondary coil connected to a load through an output switch set, wherein the primary coil may be connected to the plurality of battery sources through a plurality of input switch sets corresponding to the plurality of battery sources.

14 Claims, 7 Drawing Sheets

(51) Int. Cl.

| | | |
|---|---|---|
| *H02J 7/50* | (2026.01) | |
| *H02J 7/90* | (2026.01) | |
| *H02M 3/335* | (2006.01) | |

(52) U.S. Cl.
    CPC ..... *H02M 3/33584* (2013.01); *H02J 2207/20* (2020.01)

(58) Field of Classification Search
    CPC ............ H02M 3/285; H02M 3/00573; H02M 3/33573; H02M 3/33584
    USPC ................. 320/107, 119, 132, 133, 135, 108
    See application file for complete search history.

(56) References Cited

U.S. PATENT DOCUMENTS

| | | | |
|---|---|---|---|
| 2009/0322155 A1 | 12/2009 | Oh et al. | |
| 2010/0283433 A1 | 11/2010 | Oh et al. | |
| 2012/0267952 A1 | 10/2012 | Ballatine et al. | |
| 2013/0337755 A1 | 12/2013 | Kim et al. | |
| 2015/0283913 A1 | 10/2015 | Chemin et al. | |
| 2017/0025867 A1* | 1/2017 | Wang ................ | H02J 7/007182 |
| 2017/0264109 A1 | 9/2017 | Garnier et al. | |
| 2019/0097434 A1 | 3/2019 | Kim | |
| 2021/0044119 A1 | 2/2021 | Poland et al. | |
| 2022/0045628 A1 | 2/2022 | Chen et al. | |

FOREIGN PATENT DOCUMENTS

| | | | | | |
|---|---|---|---|---|---|
| CN | 205911771 U | | 1/2017 | | |
| CN | 112534672 A | * | 3/2021 | ............ | H01M 10/48 |
| EP | 3444921 A1 | | 2/2019 | | |
| JP | 2011-250605 A | | 12/2011 | | |
| JP | 2012-120403 A | | 6/2012 | | |
| JP | 2012-253999 A | | 12/2012 | | |
| JP | 2013-005677 A | | 1/2013 | | |
| JP | 2013-013268 A | | 1/2013 | | |
| JP | 2014-171273 A | | 9/2014 | | |
| KR | 10-1122598 B1 | | 3/2012 | | |
| KR | 10-1174166 B1 | | 8/2012 | | |
| KR | 10-1294378 B1 | | 8/2013 | | |
| KR | 10-2014-0119531 A | | 10/2014 | | |
| KR | 10-1465179 B1 | | 11/2014 | | |
| KR | 10-2015-0020704 A | | 2/2015 | | |
| KR | 10-1686018 B1 | | 12/2016 | | |
| KR | 10-2020-0085075 A | | 7/2020 | | |
| WO | WO-2020022344 A1 | * | 1/2020 | ............ | H01M 10/48 |
| WO | 2020/026965 A1 | | 2/2020 | | |
| WO | 2020/171886 A1 | | 8/2020 | | |

OTHER PUBLICATIONS

Office Action dated Sep. 2, 2024, issued in corresponding Japanese Patent Application No. 2023-503231 (including computer translation). (Note: JP 2012-253999 A cited in this JP Office Action was cited in prior IDS).

International Search Report (with translation) and Written Opinion dated Aug. 12, 2022, issued in corresponding International Patent Application No. PCT/KR2022/005730.

Extended European Search Report dated Jan. 3, 2024, issued in European Patent Application No. 22807647.7.

Turksoy, et al., "A comprehensive overview of the dc-dc converter-based battery charge balancing methods in electric vehicles," Renewable and Sustainable Energy Reviews, 2020, vol. 133, 110274, pp. 1-20.

Office Action dated Apr. 22, 2025, issued in corresponding European Patent Application No. 22807647.7. (Note: WO 2020/171886 A1, U.S. Pat. No. 10,804,809 B1, EP 3444921 A1, and WO 2020/026965 A1 cited in this EP Office Action were cited in previously-filed IDSs.).

Office Action dated Feb. 5, 2024, issued in corresponding Japanese Patent Application No. 2023-503231 (with machine translation).

Office Action dated Dec. 26, 2025, issued in corresponding Chinese Patent Application No. 202280006089.5 (with English machine translation). (Note: U.S. Pat. No. 10,804,809 B1 and US 2012/0267952 A1 cited in this CN Office Action have already been cited in prior IDSs.).

\* cited by examiner

[FIG. 1]
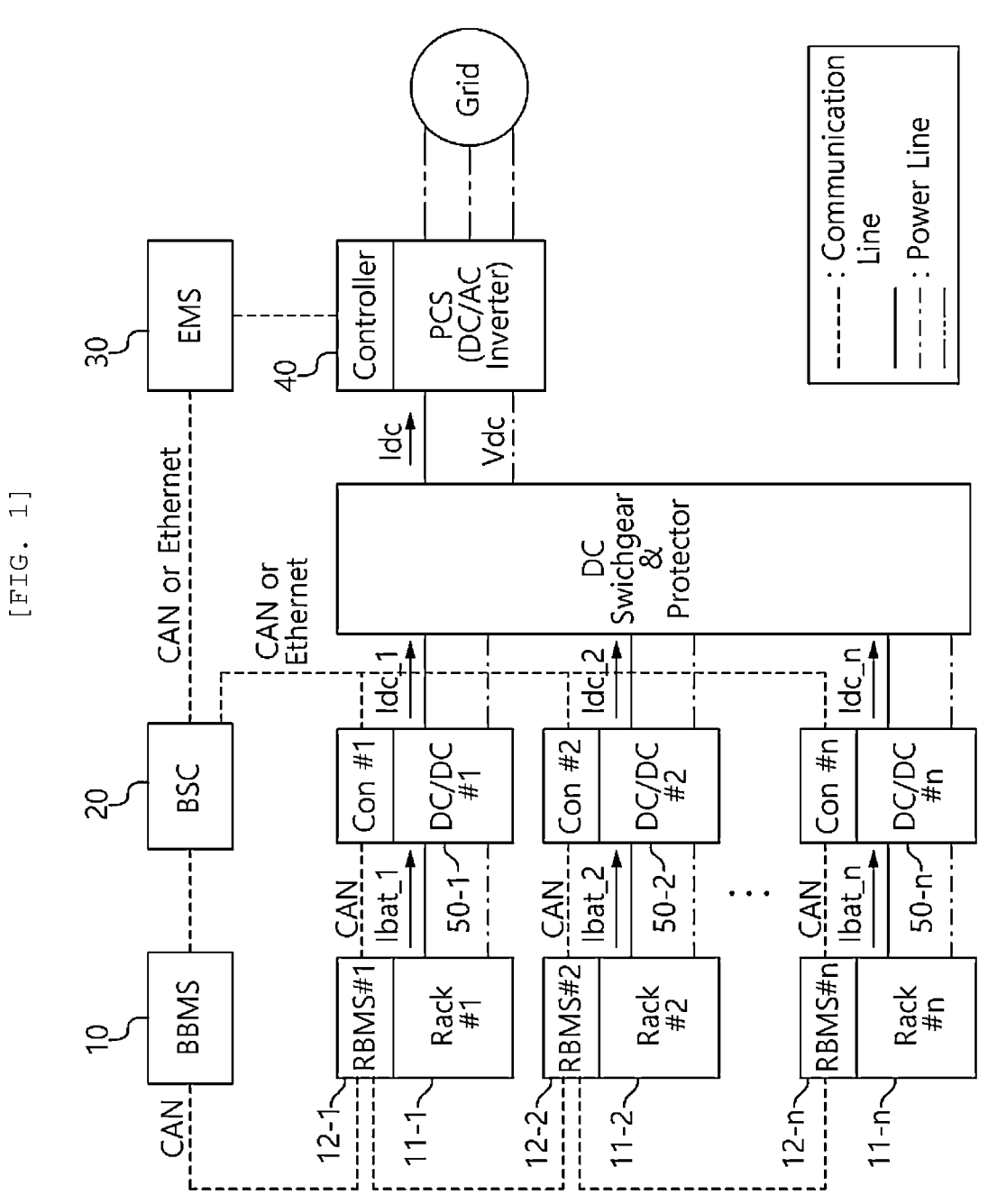

[FIG. 2]
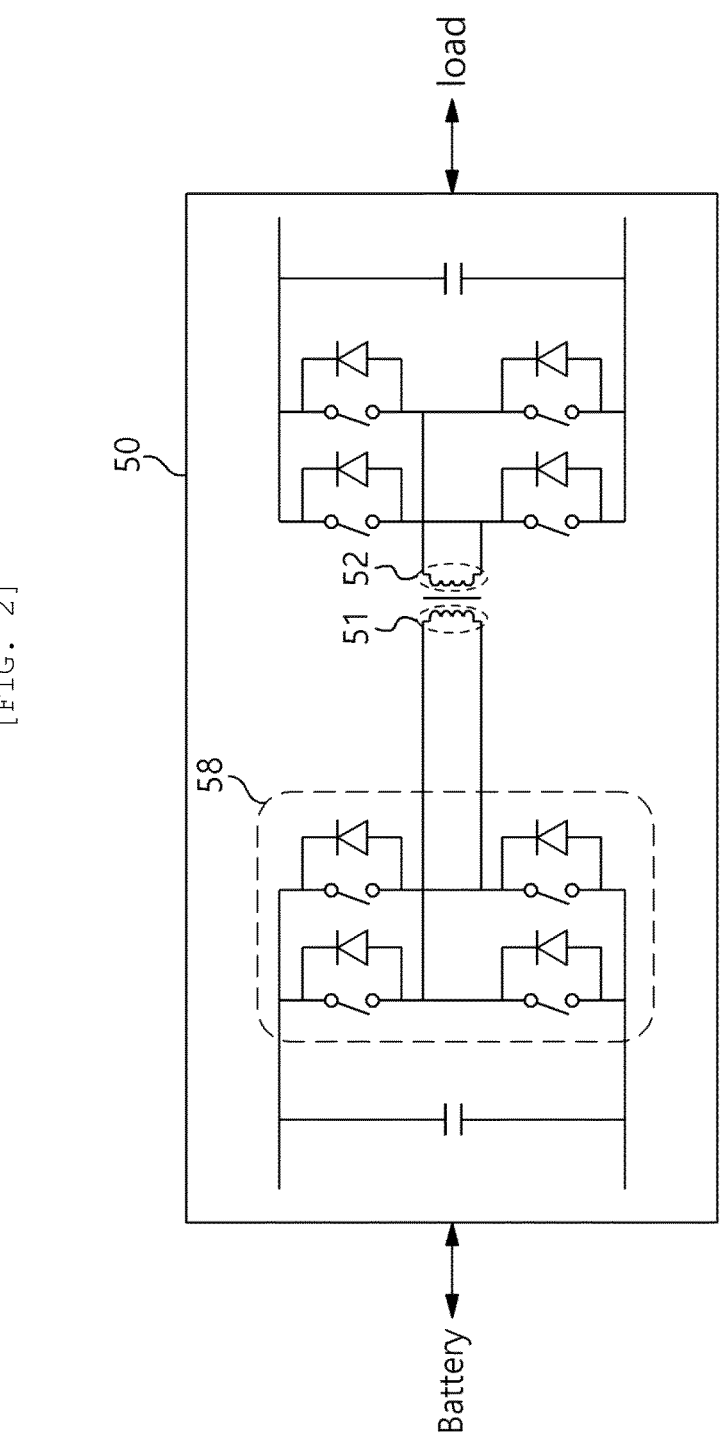

[FIG. 3]
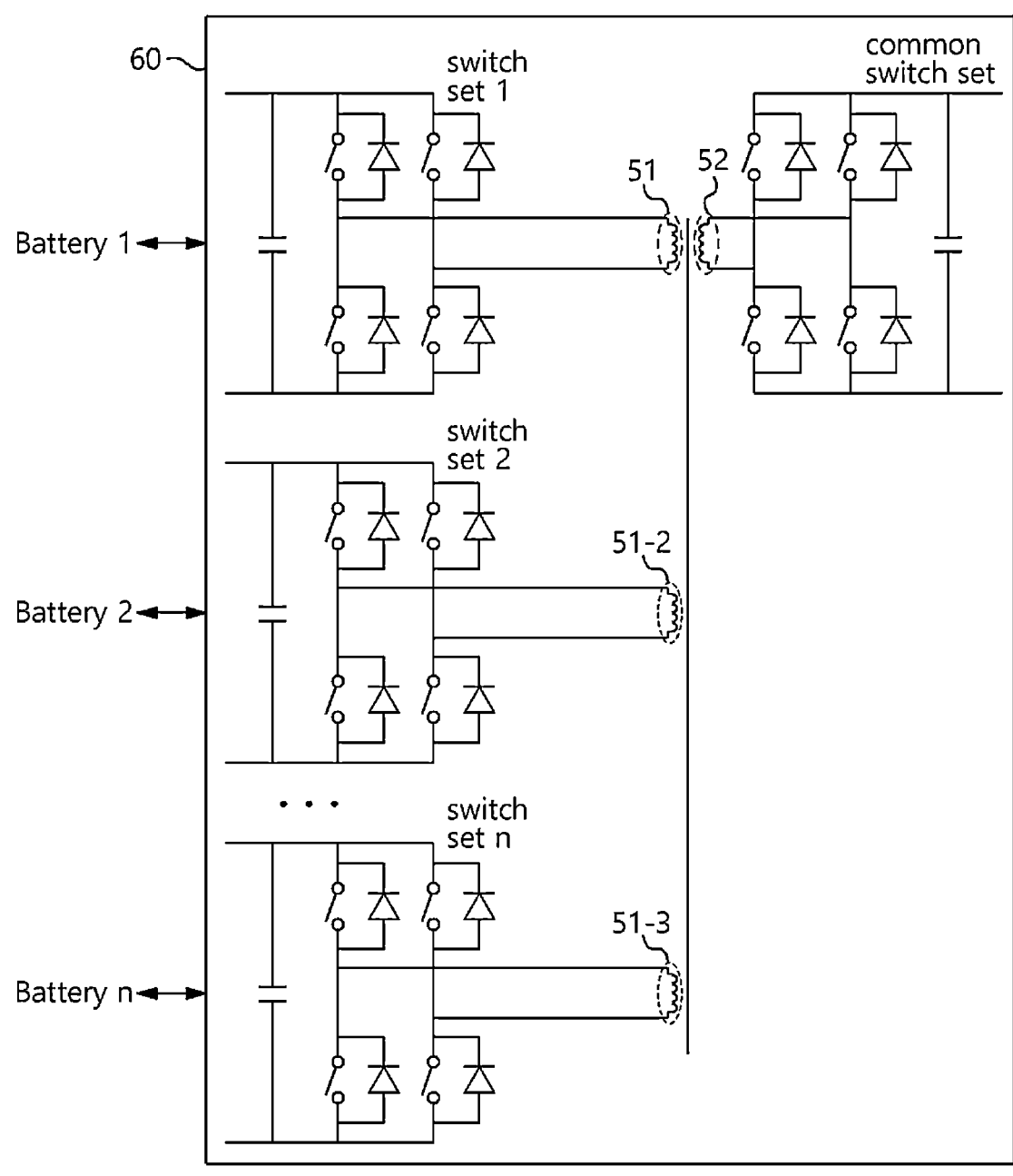

[FIG. 4]
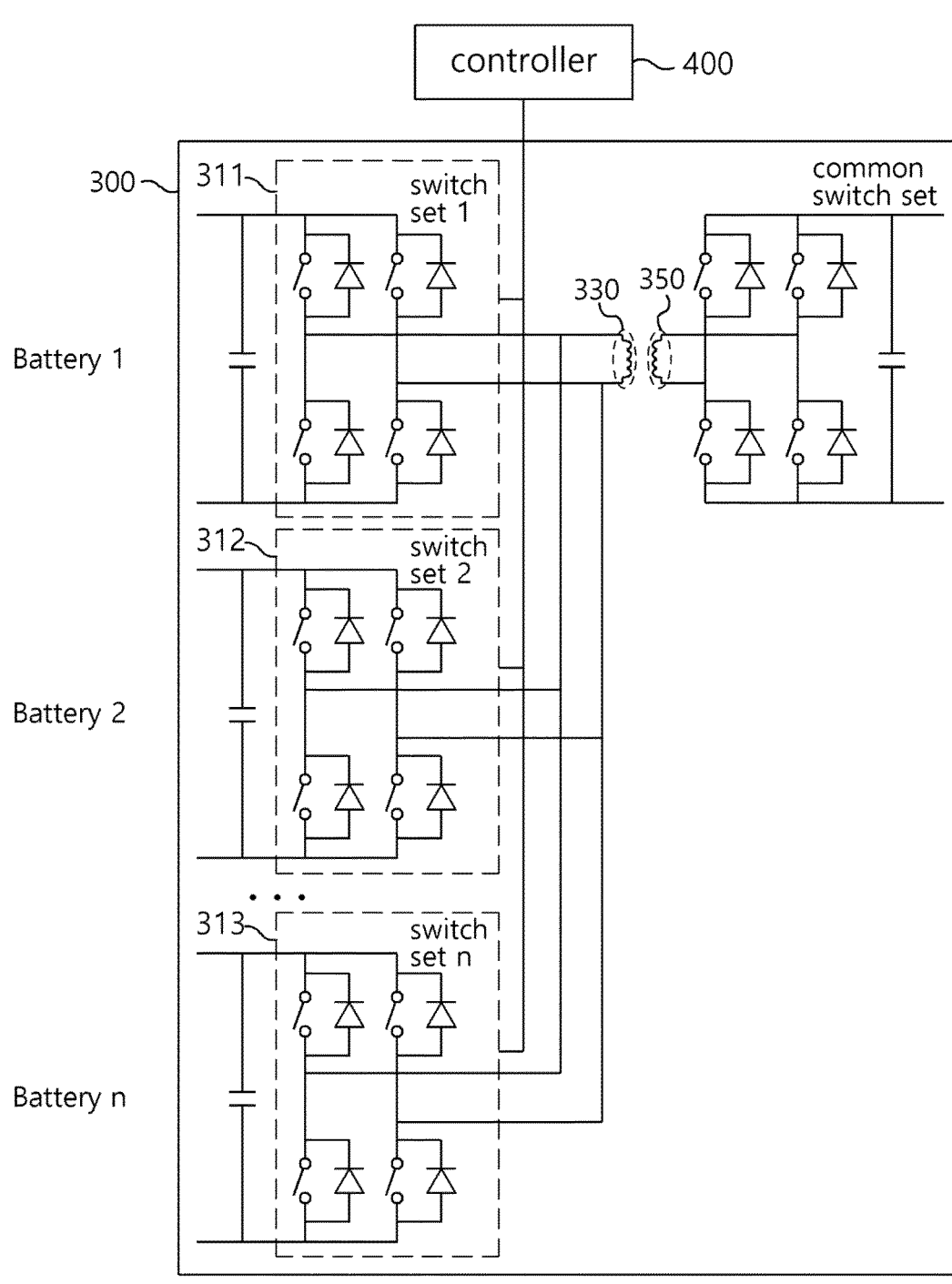

[FIG. 5]

[FIG. 6]
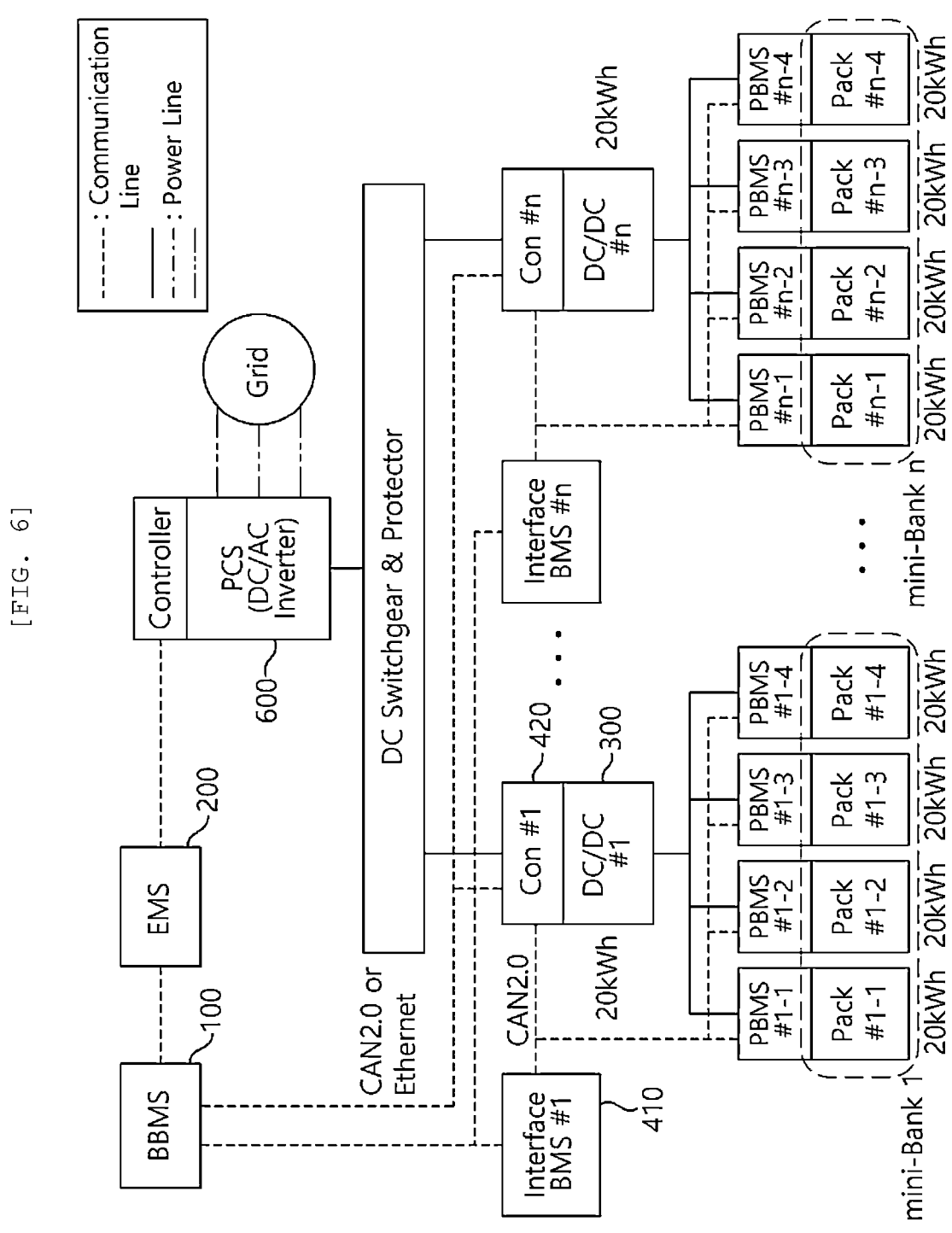

[FIG. 7]
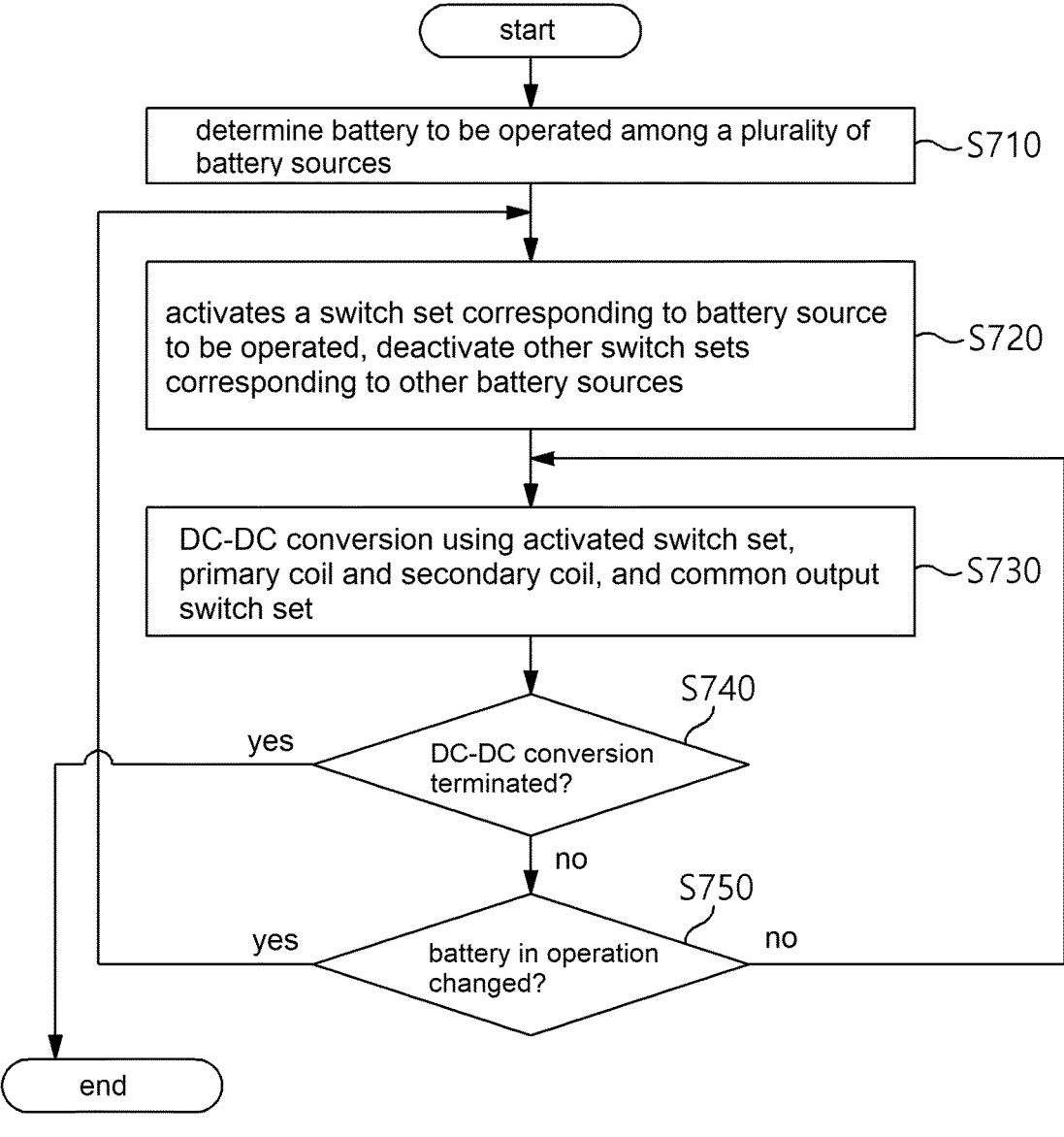

CONVERTER FOR PERFORMING DC-DC CONVERSION AND METHOD FOR CONTROLLING SAME

TECHNICAL FIELD

This application claims priority to and the benefit of Korean Patent Application No. 10-2021-0062341 filed in the Korean Intellectual Property Office on May 14, 2021, the entire contents of which are incorporated herein by reference.

The present invention relates to a converter that performs DC-DC conversion, and more particularly, to a converter positioned between a series of batteries and a power conversion system to perform DC-DC conversion and a method for controlling the same.

BACKGROUND ART

An energy storage system relates to renewable energy, a battery that stores electric power, and grid power. Recently, as the spread of smart grid and renewable energy is expanding and the efficiency and the stability of the power system are emphasized, a demand for energy storage systems for power supply and demand control and power quality improvement is increasing. Depending on a purpose of use, energy storage systems may have different output and capacity. In order to configure a large-capacity energy storage system, a plurality of battery systems may be connected.

An energy storage system may include a battery section consisting of a plurality of batteries, a battery management system (BMS) for battery management, a power conversion system (PCS), an energy management system (EMS), and a DC-DC converter.

In a DC-DC converter that performs DC-DC conversion between a battery and a power conversion system, the design of a transformer is closely related to cost, efficiency, and a size of the entire system. In general, a DC-DC converter having a plurality of input sources has a structure in which a respective coil is allocated to each input source. In particular, when input sources are batteries, each input terminal is insulated for safety reasons, which increases sizes and costs of the transformer and the converter. As the capacity of the battery and the capacity of the DC-DC converter increase, the structure of the transformer becomes a negative factor in the efficiency and the size, and thus, the converter design in a typical DC-DC converter needs to be improved.

SUMMARY

Technical Problem

To obviate one or more problems of the related art, embodiments according to an object of the present disclosure provide a DC-DC converter having one primary coil for a plurality of battery sources.

To obviate one or more problems of the related art, embodiments according to another object of the present disclosure provide a method for controlling the DC-DC converter having one primary coil for a plurality of battery sources.

To obviate one or more problems of the related art, embodiments according to yet another object of the present disclosure provide an energy storage device.

Technical Solution

To achieve the above objectives, a DC-DC converter according to an embodiment of the present disclosure is located between a plurality of batteries and a power conversion system, and comprises a primary coil connected to a plurality of battery sources and a secondary coil connected to a load through an output switch set, wherein the primary coil may be connected to the plurality of battery sources through a plurality of input switch sets corresponding to the plurality of battery sources.

In the embodiment, operations of the plurality of input switch sets may be controlled by a controller connected to the converter so that only one output of the plurality of battery sources is transmitted to the primary coil.

Here, each battery source may be a battery pack, a battery rack, a battery unit, or a battery cell. The load may include the power conversion system.

In the embodiment, the converter may be configured to perform DC-DC conversion using one input switch set in operation among the plurality of input switch sets corresponding to the plurality of battery sources and the output switch set connected to the load during one period of time.

Furthermore, the converter may be configured to convert output from the power conversion system to a voltage level required by the plurality of batteries in a charging mode, and may be configured to convert output from the plurality of batteries connected to one input switch set in operation into a DC link voltage which is a voltage level required by the power conversion system in a discharging mode.

According to another embodiment of the present invention, a method for controlling a converter by a controller interworking with the converter positioned between a plurality of batteries and a power conversion system may comprise determining a battery source to be operated in a certain period of time among a plurality of battery sources connected to the converter; activating one input switch set corresponding to the battery source in operation and deactivating the other input switch sets corresponding to the other battery sources; and controlling the converter to perform DC-DC conversion.

In the embodiment, the activating one input switch set corresponding to the battery source in operation and deactivating the other input switch sets corresponding to the other battery sources may comprise controlling a plurality of input switch sets connected to the plurality of battery sources so that only the output of input switch set corresponding to the battery source in operation is transmitted to the primary coil of the converter.

Here, each battery source may be a battery pack, a battery rack, a battery unit, or a battery cell.

In the embodiment, the controlling the converter to perform DC-DC conversion may comprise controlling the converter to perform DC-DC conversion using one input switch set in operation among a plurality of input switch sets corresponding to the plurality of battery sources and an output switch set connected to a load during one period of time.

Furthermore, the controlling the converter to perform DC-DC conversion may comprise converting output from the power conversion system to a voltage level required by the plurality of batteries in a charging mode.

Furthermore, the controlling the converter to perform DC-DC conversion may comprise converting power output from the plurality of batteries connected to the input switch set in operation into a DC link voltage which is a voltage level required by the power conversion system in a discharging mode.

According to another embodiment of the present invention, an energy storage device may comprise a plurality of battery sources; a DC-DC converter including one primary coil connected to the plurality of battery sources and a secondary coil connected to a load; and a controller configured to control the DC-DC converter such that the primary coil transmits power from one of the plurality of battery sources to the load.

In the embodiment, the DC-DC converter may include a plurality of input switch sets respectively connected to the plurality of battery sources and one input switch set among the plurality of input switch sets may be activated during one period of time under the control of the controller.

Advantageous Effects

According to the embodiments of the present invention, it is possible to reduce the size of the transformer in the converter and the size of the converter compared to a conventional DC-DC converter, and accordingly, cost reduction and increased DC-DC efficiency can be expected.

In addition, the safety function secured through insulation previously can be secured through switching among battery sources using operation control of the switch sets.

BRIEF DESCRIPTION OF THE DRAWINGS

FIG. 1 is a block diagram of a conventional energy storage system having an individual DC-DC converter for each battery rack.

FIG. 2 is a simplified circuit diagram of a conventional DC-DC converter.

FIG. 3 is a simplified circuit diagram of a conventional DC-DC converter having multiple input sources.

FIG. 4 is a schematic configuration diagram of an energy storage device according to an embodiment of the present invention.

FIG. 5 is a conceptual diagram of a switching operation of a DC-DC converter according to an embodiment of the present invention.

FIG. 6 is a block diagram of an ESS system to which a DC-DC converter according to an embodiment of the present invention is applied.

FIG. 7 is a flowchart showing a method for controlling a DC-DC converter according to an embodiment of the present invention.

EXPLANATION OF REFERENCE NUMERALS

100: BMS
200: EMS
300: DC-DC converter
311, 312, 313: switch set
330: primary coil
350: secondary coil
400: controller
410: interface-BMS
420: DC-DC converter controller

DETAILED DESCRIPTION

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a block diagram of a typical energy storage system having an individual DC-DC converter for each battery rack.

As to battery that serves to store energy in an energy storage system, typically a plurality of battery modules may form a battery rack and a plurality of battery racks 11-1, 11-2, 11-n may form a battery bank. Here, depending on a device or system in which the battery is used, a battery rack may be referred to as a battery pack.

A battery management system (BMS) may be installed in each of a battery module, a battery rack, and a battery bank. Referring to FIG. 1, each RBMS (Rack BMS) 12-1, 12-2, . . . , 12-n manages each battery rack, BBMS (Bank BMS) (10) may control the entire battery bank including battery racks. The BBMS 10 may monitor a current, a voltage, and a temperature of the battery bank, calculate a state of charge (SOC) based on monitoring results, and control charging and discharging of the batteries. In addition, each of the RBMS 12-1, 12-2, . . . , 12-n monitors a current, a voltage and a temperature of each battery rack, calculates SOC based on the monitoring results, and controls charging and discharging of the batteries.

A battery section controller (BSC) 20 is located in each battery section which includes a plurality of batteries and peripheral circuits, and devices to monitor and control objects such as a voltage, a current, a temperature, and a circuit breaker.

The power conversion system (PCS) 40 installed in each battery section controls the power supplied from the outside and the power supplied from the battery section to the outside, thereby controlling charging and discharging of the battery. The power conversion system may include a DC/AC inverter. An Energy Management System (EMS) 20 connected to the power conversion system may control the output of the power conversion system based on the monitoring and control results of the battery management system or the battery section controller.

In the energy storage system of FIG. 1, battery rack 1 (11-1) is connected to DC-DC converter #1 (12-1), battery rack 2 (11-2) is connected to DC-DC converter #2, and battery rack n(11-n) is connected to DC-DC converter #n(12-n). Thus, a respective DC-DC converter corresponding to each battery rack is used. The output of the DC-DC converter corresponding to each battery rack is collected through a DC Switchgear & Protector and is forwarded to the power conversion system 40.

Here, the DC-DC converter may convert the power stored in the battery into a voltage level required by the PCS 40 in a discharging mode, wherein the voltage level is a DC link voltage. Meanwhile, in a charging mode, the DC-DC converter may convert power output from the PCS 40 to a voltage level required by the battery which is a charging voltage.

The RBMS 12-1, 12-2, . . . , 12-n, the BBMS 10, the BSC 20, the EMS 30, and the PCS controller may communicate using CAN (Controller Area Network) or Ethernet.

FIG. 2 is a simplified circuit diagram of a typical DC-DC converter.

The DC-DC converter may be a bidirectional converter, wherein, when conversion is performed from the battery to the load direction, the input of the DC-DC converter may be connected to the battery (battery unit, battery rack or battery pack) and the output of the DC-DC converter may be connected to the load.

The converter in FIG. 2 shows an example of a full-bridge converter. In the converter shown in FIG. 2, the input terminal includes a capacitor, an input switching set 58, and a primary coil 51, and the output terminal includes a secondary coil 52, an output switching set and a capacitor.

FIG. 3 is a simplified circuit diagram of a typical DC-DC converter having multiple input sources.

The converter in FIG. 3 shows an example of a full-bridge converter in which three battery sources are connected to the input terminal of the converter. The converter 60 shown in FIG. 3 includes a capacitor, input switch sets (switch set 1, switch set 2, . . . , switch set n) and primary coils 51-1, 51-2, and 51-3 for battery sources. That is, for each of the batteries, a corresponding input switch set and a corresponding primary coil are arranged and used. In this case, it is common for each input terminal to be insulated for safety reasons.

Somehow, the output terminal of the converter includes a secondary coil 52, a common output switch set, and a capacitor.

In conventional converters, for multiple battery sources, a separate converter is used for each individual battery source (a battery pack, a battery rack, or a battery cell) (as shown in FIG. 2) or a separate primary coil for each battery unit is used even though one converter for a multiple battery units is used (as shown in FIG. 3). That is, in both cases, a separate primary-coil is used for each battery source, so that a plurality of primary coils are used for a plurality of battery sources.

In such a multi-coil (multi-winding) transformer in which a plurality of coils are arraigned in the primary side, as the capacity of the DC-DC converter increases, the wire becomes thicker, and difficulty in designing the transformer occurs accordingly. In other words, the efficiency of the product decreases, the size and the cost increase.

FIG. 4 is a schematic configuration diagram of an energy storage device according to an embodiment of the present invention.

An energy storage device according to an embodiment of the present invention comprises a plurality of battery sources; a DC-DC converter 300 including one primary coil connected to a plurality of battery sources and a secondary coil connected to a load; and a controller 400 configured to control the DC-DC converter such that the primary coil transmits power from one of the plurality of battery sources to the load.

Here, the DC-DC converter may include a plurality of switch sets respectively connected to the plurality of battery sources, and only one switch set among the plurality of switch sets may be activated during a period of time under the control of the controller.

The DC-DC converter to which the present invention is applied may be a bidirectional converter, wherein, when conversion is performed from the battery to the load direction, the input of the DC-DC converter may be connected to the battery (battery unit, battery rack or battery pack) and the output of the DC-DC converter may be connected to the load. In the present specification, for convenience of description, the left side of the converter in FIG. 4, which is a battery side, is referred to as an input or primary side, and the right side of the converter, which is a load side, is referred to as an output or secondary side. However, when charging the battery is performed, the input and the output may be described in reverse compared to a case when discharging occurs from the battery to the load.

Examples of the DC-DC converter to which the present invention can be applied include, in addition to a full-bridge converter, other types of converters such as a half-bridge converter or a flyback converter. Details of these converters may have different configurations in terms of internal circuits compared to a full-bridge converter. Somehow, a half-bridge converter or a flyback converter may include at least one of a primary coil, a secondary coil, and switch sets or circuits connected to each coil.

FIG. 4 shows an embodiment in which the converter 300 according to the present invention is a full-bridge converter. In the present invention, a converter having plural or multiple battery sources as input is considered. Referring to FIG. 4, the DC-DC converter is located between a plurality of batteries (battery 1, battery 2, . . . , battery n) and a power conversion system. The converter is configured to perform DC-DC conversion and to have a plurality of batteries as a plurality of inputs and have one output connected to a load. Each battery may be connected to an individual switch set, for example, battery 1 may be connected to switch set 1 (311), battery 2 may be connected to switch set 2 (312), and battery n may be connected to switch set n (313).

In the present invention, all of switch set 1, switch set 2, and switch set n may be connected to one primary coil 330. That is, the DC-DC converter according to the present invention has a single primary coil for a plurality of battery sources as input. Accordingly, in a transformer structure as shown in FIG. 4, one primary coil 330 on the primary side and one secondary coil 350 on the secondary side are arraigned. The secondary coil 350 may be connected to a load through a common switch set of the output terminal.

That is, the DC-DC converter according to an embodiment of the present invention is configured to include a primary coil connected to a plurality of battery sources; and a secondary coil connected to a load through an output switch set. The primary coil is connected to the plurality of battery sources through a plurality of input switch sets corresponding to the plurality of battery sources. Here, each battery source may be a battery pack, a battery rack, a battery unit, or a battery cell.

In addition, the converter according to another embodiment of the present invention may include a primary coil connected to a plurality of battery sources; a plurality of switch sets connected to each of the plurality of battery sources and connected to the primary coil; and a secondary coil connected to a load through an output switch set.

In this DC-DC converter structure according to the present invention, operation control is required for preventing power circulation between a plurality of battery sources. For implementing this, switching operation control by the controller 400 connected to the DC-DC converter 300 may be performed. The controller 400 interworking with the DC-DC converter controls switching for each battery source. In other words, the controller 400 is connected to input switch sets, each corresponding to respective battery source, to control switching operation of each input switch set.

Figure 5:
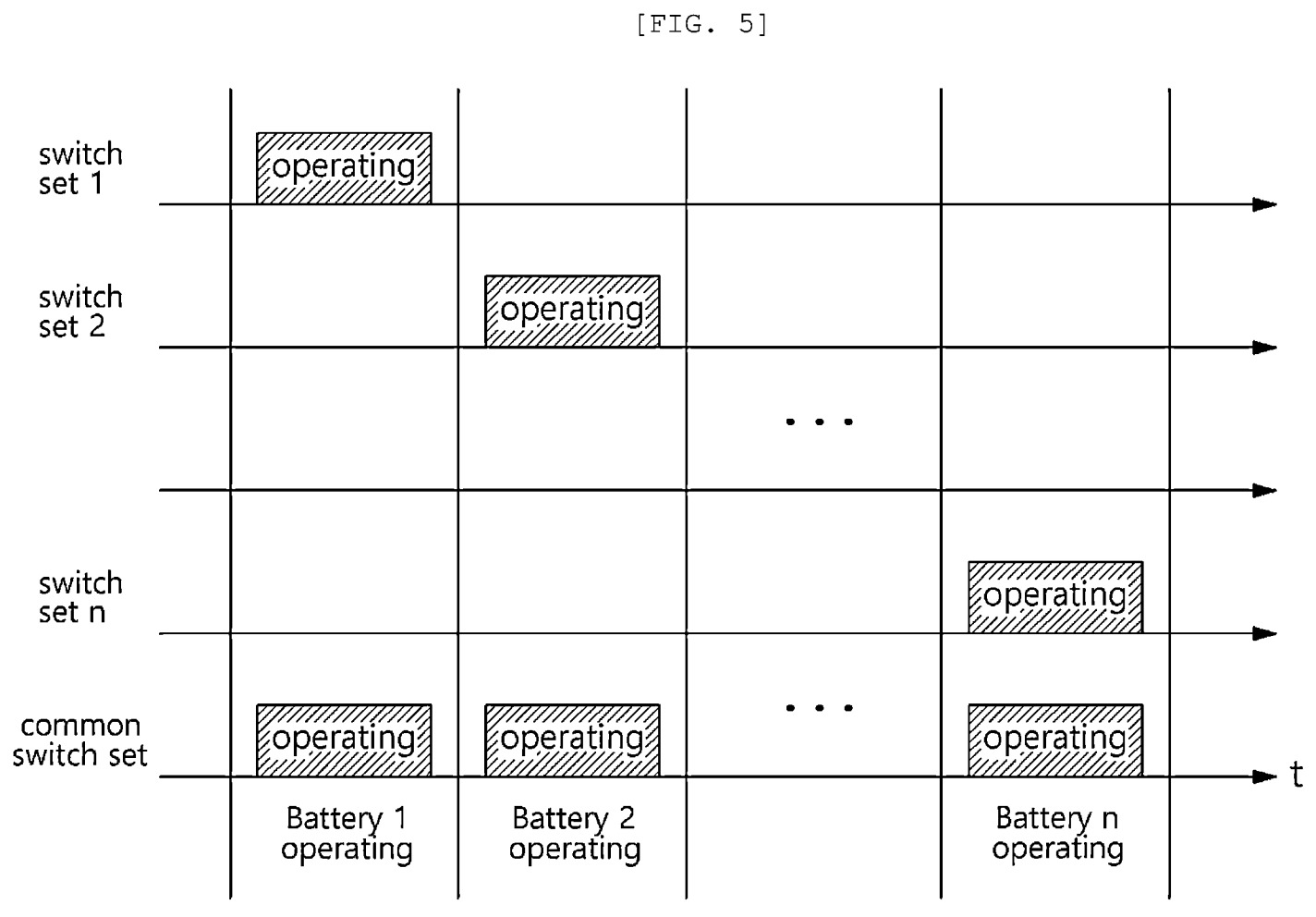

FIG. 5 is a conceptual diagram of a switching operation of a DC-DC converter according to an embodiment of the present invention.

The graph in FIG. 5 shows operations of each switch set in periods of time. One common switch set is arranged at the output terminal of the converter and operates accordingly when any of the battery sources at the input terminal operates, so that a corresponding battery source performs charge/discharge operation.

In the input terminal, when battery 1 is operating, only switch set 1 operates correspondingly and operations of the input switching circuits of battery 2 and battery 3 are controlled to be stopped by the controller. In addition, when battery 2 is operating, only switch set 2 operates and operations of the input switching circuits of battery 1 and battery 3 are controlled to be stopped by the controller. Here, a switch set in operation means that high-speed switching by the switch set for DC-DC conversion of power from a battery source is being performed.

Accordingly, a DC-DC converter according to an embodiment of the present invention is configured to perform DC-DC conversion using one input switch set among a plurality of input switch sets corresponding to a plurality of battery sources and an output switch set connected to a load during one time period.

In a charging mode, the DC-DC converter may convert power output from a power conversion system to a voltage level required by the battery. In a discharging mode, the DC-DC converter may convert output from a battery connected to one input switch set in operation into a DC link voltage that is a voltage level required by the power conversion system.

FIG. 6 is a block diagram of an energy storage system to which a DC-DC converter according to an embodiment of the present invention is applied.

FIG. 6 shows an energy storage system including a DC-DC converter with battery packs using reused batteries according to an embodiment of the present invention.

Referring to FIG. 6, the output of the DC-DC converter 300 is connected to the PCS 600, and the PCS is connected to the power grid. The exemplary system in FIG. 6 shows a structure in which a mini-bank includes four battery packs and several mini-banks may be gathered to form one battery bank. Each pack BMS (PBMS #1-1, PBMS #1-2, PBMS #1-3, PBMS #1-4) may manage and control each pack (pack #1-1, pack #1-2, pack #1-3, pack #1-4). The interface-BMS 410 may manage and control a plurality of battery packs included in one minibank. In addition, a plurality of interface-BMSs for controlling mini-banks are connected to a Bank BMS (BBMS), and the BBMS may control the battery bank in overall and control output of each DC-DC converter.

Here, each of the PBMS, the interface-BMS 410 and the BBMS 100 may monitor a current, a voltage, and a temperature from the battery bank, the mini-bank, and the battery pack, thereby calculating SOC (State Of Charge) of the battery based on the monitoring result and controlling charging and discharging of the system.

The energy management system (EMS) 200 is configured control and manage the overall ESS by controlling output of the PCS 600 based on monitoring and control results of the BMS.

The power conversion system (PCS) 600 may be a DC/AC inverter that controls charging and discharging of the battery by controlling power supplied from the outside to the battery section and power supplied from the battery section to the outside.

The DC/AC inverter may be a bidirectional inverter, and converts a DC link voltage output from the battery into the AC voltage of the grid in a discharging mode. On the contrary, the DC/AC inverter may rectify the AC voltage of the grid and convert it into a DC link voltage to store the grid power in the battery in a charging mode.

The DC/AC inverter may include a filter for removing harmonics from the AC voltage and a phase locked loop (PLL) circuit that synchronizes a phase of the output AC voltage with a phase of the AC voltage of the grid. The DC/AC inverter may also perform functions such as limiting a voltage fluctuation range, improving a power factor, and removing a DC component.

In the energy storage system of FIG. 6, battery packs #1-1, #1-2, #1-3, and #1-4 are connected to DC-DC converter #1 (300). That is, a plurality of battery packs are connected to one DC-DC converter, and the DC-DC converter transmits an output from only one battery pack to the PCS 600 through switching among the plurality of battery packs. Similarly, battery packs #2-1, #2-2, #2-3, #2-4 are connected to DC-DC converter #2, and battery packs #n-1, #n-2, #n-3, #n-4 are connected to DC-DC converter #n.

For example, according to a conventional ESS system, a separate DC-DC converter is used for each 20 kW battery pack, or a plurality of coils are required for a transformer in a DC-DC converter. On the other hand, according to the present invention, it is possible to connect and use a plurality of battery packs with one DC-DC converter of 20 kW. The DC-DC converter according to the embodiment of the present invention may be configured to have one coil on the primary side and one coil on the secondary side.

Somehow, in order to prevent simultaneous operations of the battery packs in the minibank managed by one DC-DC converter 300, switching control for input switch circuits connected to each of the battery packs in the DC-DC converter 300 may be performed. The switching operation among battery packs may be performed by a controller 420 of the DC-DC converter, or an interface BMS 410, or the controller 420 and the interface BMS 410 of the DC-DC converter. In FIG. 6, the controller 420 of the DC-DC converter and the interface BMS 410 are shown as separate components, but depending on implementation, they may be integrated into one software or hardware structure.

The outputs of the DC-DC converters may be collected through a DC Switchgear & Protector and connected to the PCS 600. Referring to FIG. 6, a plurality of DC-DC converters (DC-DC converter #1, . . . , DC-DC converter #n) can operate simultaneously. For example, when five converters can operate simultaneously, the total output is 100 kW, which may be a capacity of the PCS 600 connected with the converters.

Here, the DC-DC converter is configured to convert power stored in the battery into a voltage level required by the PCS 600, that is, a DC link voltage, and outputs the converted power in a discharging mode. Meanwhile, in a charging mode, the DC-DC converter is configured to convert power output from the PCS 600 to a voltage level required by the battery, that is, a charging voltage.

Meanwhile, communication using CAN or Ethernet may be performed among the PBMS, the interface BMS 410, the BBMS 100, the EMS 200, and the PCS controller.

FIG. 7 is a flowchart showing a method for controlling a DC-DC converter according to an embodiment of the present invention.

The method of controlling the DC-DC converter according to the preferred embodiment of the present invention may be performed by the controller 400 interworking with the DC-DC converter. Here, the controller 400 may be the DC-DC converter controller 420 described in the embodiment of FIG. 6. Somehow, the controller may include a part of the DC-DC converter controller and a part of the interface BMS, since the converter controller and the interface BMS may be implemented in one integrated structure.

According to a preferred embodiment of the present invention, the controller may determine a battery to be operated in a specific time period among a plurality of battery sources S710, activate a switch set corresponding to the battery source to be operated, and deactivate the other switch sets corresponding to the other battery sources S720. That is, only the output of the switch set corresponding to the battery source operating needs to be transmitted to the primary coil.

Thereafter, the controller controls the DC-DC converter to perform DC-DC conversion using the activated switch set, the primary coil and the secondary coil, and the common output switch set S730. Here, the DC-DC conversion in a discharging mode may be performed such that the power stored in the battery is DC-DC converted into a voltage level required by the PCS, that is, a DC link voltage. Meanwhile, DC-DC conversion in a charging mode may be performed such that power output from the PCS is DC-DC converted into a voltage level required by the battery, that is, a charging voltage.

The controller may check whether DC-DC conversion should be terminated according to an end of charging or discharging S740, and may continue the process. If the battery in operation is changed S750, the process returns to S720 to activate a corresponding switch set according to a change of the battery in operation, to deactivate the other switch sets, and to perform DC-DC conversion.

When the battery in operation is not changed (No in S750), DC-DC conversion using the activated switch set, the primary coil and the secondary coil, and the common switch set may be continuously performed.

As described above, the present invention may implement a safety function, which is secured through insulation in the prior art, using switching among battery sources through operation control for input switch sets of a plurality of battery sources.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

Some aspects of the present invention have been described above in the context of a device but may be described using a method corresponding thereto. Here, blocks or the device corresponds to operations of the method or characteristics of the operations of the method. Similarly, aspects of the present invention described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, one or more of most important operations of the method may be performed by such a device.

While the example embodiments of the present invention and their advantages have been described in detail, it should be understood that various changes, substitutions and alterations may be made herein without departing from the scope of the invention.

The invention claimed is:

1. A DC-DC converter connected between a plurality of battery sources and a power conversion system, the DC-DC converter comprising:

a primary coil connected to the plurality of battery sources; and a secondary coil connected to a load through an output switch set, wherein the primary coil is connected to the plurality of battery sources through a plurality of input switch sets respectively corresponding to the plurality of battery sources, and wherein the converter is configured to perform DC-DC conversion using one input switch set in operation, among the plurality of input switch sets corresponding to the plurality of battery sources, and the output switch set connected to the load during one period of time.

2. The DC-DC converter of claim 1, wherein operations of the plurality of input switch sets are configured to be controlled by a controller connected to the converter so that an output from only one of the plurality of battery sources corresponding to the one input switch set in operation is transmitted to the primary coil at a time.

3. The DC-DC converter of claim 1, wherein each of the plurality of battery sources includes a battery pack, a battery rack, a battery unit, or a battery cell.

4. The DC-DC converter of claim 1, wherein the load includes the power conversion system.

5. The DC-DC converter of claim 4, wherein the converter is further configured to convert an output from the power conversion system to a voltage level required by the plurality of battery sources in a charging mode.

6. The DC-DC converter of claim 4, wherein the converter is further configured to convert an output from the plurality of battery sources connected to the one input switch set in operation into a DC link voltage which is a voltage level required by the power conversion system in a discharging mode.

7. A method for controlling a converter by a controller interworking with the converter connected between a plurality of battery sources and a power conversion system, the method comprising:

determining a battery source to be operated in one period of time among the plurality of battery sources connected to the converter;

activating one input switch set, among a plurality of input switch sets, corresponding to the battery source in operation and deactivating other input switch sets, among the plurality of input switch sets, corresponding to the other battery sources among the plurality of battery sources; and controlling the converter to perform DC-DC conversion using the one input switch set corresponding to the battery source in operation, among the plurality of input switch sets corresponding to the plurality of battery sources, and an output switch set connected to a load during the one period of time.

8. The method of claim 7, wherein the activating of the one input switch set corresponding to the battery source in operation and the deactivating of the other input switch sets corresponding to the other battery sources comprises controlling the plurality of input switch sets respectively connected to the plurality of battery sources so that only an output of the one input switch set corresponding to the battery source in operation is transmitted to a primary coil of the converter.

9. The method of claim 7, wherein each of the plurality of battery sources includes a battery pack, a battery rack, a battery unit, or a battery cell.

10. The method of claim 7, wherein:

the load includes the power conversion system; and the controlling of the converter to perform DC-DC conversion comprises converting an output from the power conversion system to a voltage level required by the plurality of battery sources in a charging mode.

11. The method of claim 7, wherein:

the load includes the power conversion system; and the controlling of the converter to perform DC-DC conversion comprises converting a power output from the plurality of battery sources connected to the one input switch set in operation into a DC link voltage which is a voltage level required by the power conversion system in a discharging mode.

12. An energy storage device, comprising:

a plurality of battery sources;

a DC-DC converter including:

a primary coil connected to the plurality of battery sources through a plurality of input switch sets, respectively; and a secondary coil connected to a load through an output switch set; and a controller configured to control the DC-DC converter such that the primary coil transmits power from one of the plurality of battery sources to the load, wherein the DC-DC converter is configured to perform DC-DC conversion using one input switch set connected to the one of the plurality of battery sources, among the plurality of input switch sets, and the output switch set connected to the load during one period of time.

13. The energy storage device of claim 12, wherein the one input switch set, among the plurality of input switch sets, is activated during the one period of time under the control of the controller.

14. The energy storage device of claim 12, wherein each of the plurality of battery sources includes a battery pack, a battery rack, a battery unit, or a battery cell.

* * * * *